United States Patent
Shimizu

(10) Patent No.: US 7,259,786 B2
(45) Date of Patent: Aug. 21, 2007

(54) IMAGE PROCESSING METHOD AND APPARATUS, AND IMAGE SENSING APPARATUS

(75) Inventor: Masami Shimizu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 476 days.

(21) Appl. No.: 10/677,907

(22) Filed: Oct. 1, 2003

(65) Prior Publication Data

US 2004/0119841 A1 Jun. 24, 2004

(30) Foreign Application Priority Data

Oct. 1, 2002 (JP) .............................. 2002-288880

(51) Int. Cl.
*H04N 5/76* (2006.01)
(52) U.S. Cl. ............................... 348/231.6
(58) Field of Classification Search ............ 348/231.6, 348/231.3
See application file for complete search history.

(56) References Cited

U.S. PATENT DOCUMENTS

| | | | |
|---|---|---|---|
| 6,532,039 B2 * | 3/2003 | Anderson | 348/231.3 |
| 6,539,177 B2 * | 3/2003 | Parulski | 348/333.11 |
| 6,657,658 B2 * | 12/2003 | Takemura | 348/333.12 |
| 2001/0020978 A1 * | 9/2001 | Matsui et al. | 348/333.02 |
| 2001/0035909 A1 * | 11/2001 | Kubo | 348/232 |
| 2002/0196350 A1 * | 12/2002 | Cooper | 348/231.6 |
| 2003/0043274 A1 * | 3/2003 | Gentile | 348/207.99 |
| 2003/0112342 A1 * | 6/2003 | Takeuchi | 348/231.6 |
| 2004/0041926 A1 * | 3/2004 | Takano et al. | 348/241 |
| 2004/0056873 A1 * | 3/2004 | Chang et al. | 345/660 |
| 2004/0135889 A1 * | 7/2004 | Koizumi et al. | 348/207.1 |
| 2004/0184072 A1 * | 9/2004 | Jacobsen et al. | 358/1.15 |
| 2004/0201714 A1 * | 10/2004 | Chung | 348/220.1 |
| 2004/0257463 A1 * | 12/2004 | Goris et al. | 348/372 |
| 2005/0012829 A1 * | 1/2005 | Tashiro et al. | 348/231.99 |
| 2006/0187241 A1 * | 8/2006 | Boler et al. | 345/660 |

* cited by examiner

Primary Examiner—Vivek Srivastava
Assistant Examiner—Jason Whipkey
(74) Attorney, Agent, or Firm—Morgan & Finnegan, LLP

(57) ABSTRACT

In an image processing method for processing complex data including at least RAW data, first simulation image data of which data amount is less than the RAW data, and a first processing condition for the RAW data, when a second processing condition for the RAW data is set, second simulation image data is generated by reflecting the second processing condition on the RAW data and then reducing its data amount, and the complex data is updated with the second processing condition and the second simulation image data.

29 Claims, 16 Drawing Sheets

FIG. 8

| MODEL    D60 | ~402 |

| DATE |
| --- |
| SHUTTER SPEED |
| APERTURE VALUE |
| EXPOSURE MODE (STANDARD, SHUTTER PRIORITY, APERTURE PRIORITY, ETC.) |
| ⋮ |

IMAGE PROCESSING METHOD AND APPARATUS, AND IMAGE SENSING APPARATUS

FIELD OF THE INVENTION

The present invention relates to image processing method and apparatus, and an image sensing apparatus, and in particular, to the image processing method and apparatus, and image sensing apparatus which process an image obtained by sensing an object with a digital camera.

BACKGROUND OF THE INVENTION

A conventional image sensing apparatus such as a digital still camera performs a predetermined process on an electrical signal (image data) of a sensed image obtained by photoelectrically converting an optical image of an object with an image sensing device such as a CCD, and then records image information (image data) of the sensed image as electrical (magnetic) information on an external recording medium such as a memory card or a hard disk. Thus, unlike a conventional silver halide film camera which records an image on a film by exposing the film, the digital still camera applies image processes and records the electrical signal of the sensed image as positional information on pixels in one frame of the image so that the recorded image can be reproduced.

As for the digital still camera in recent years, high-pixelation of the image sensing device is underway for the sake of faithful reproduction of the image, and the quality of the reproduced image sensed by the digital still camera is becoming closer to the quality of the image sensed by the silver halide film camera.

However, there is a problem that a very large amount of information (data amount) is required as the image data of the sensed image to be recorded and reproduced in the digital still camera. Therefore, in general, a data amount of the sensed image to be recorded is reduced by compressing the image data before recording.

As for image compression methods for compressing the image data, there are a lossless compression method giving priority to preservability (reproducibility) at the sacrifice of compressibility and a lossy compression method giving priority to the compressibility at the sacrifice of the preservability (reproducibility). Concerning the lossless compression method, for instance, the method of developing differences between consecutive image data into run-length information and encoding it by using a table is generally known. As regards the lossy compression method, the method of suppressing high-frequency information of the image data by using orthogonal transformation such as discrete cosine transform (DCT) and then encoding it by using a table is generally known.

There are the cases, however, where a user using the digital still camera prefers selective use such as storing the image to be preserved merely as a record in the form of lossy-compressed image data and storing the image to be preserved as his/her work in the form of lossless-compressed image data. Furthermore, in conjunction with improved performance of the digital still camera, there are demands to generate the image data of the sensed image simultaneously by both the lossless compression method and lossy compression method.

Thus, there is a proposal of a digital camera capable of, without degrading a throughput in image sensing operation, compressing the image data of a sensed image by a plurality of different image compression methods and generating image data compressed by the respective image compression methods.

Both the lossless compression method and lossy compression method fall within the category of the conventional JPEG method. However, a JPEG image generally refers to the one compressed by the latter method. In general, the lossless-compress d image data is added with image developing conditions on generating the lossy-compressed JPEG image data.

The image processing conditions include the processing conditions in black correction, white balance correction, gray level correction and so on.

There is an image processing apparatus which receives the lossless-compressed image data and image developing conditions thus recorded and performs predetermined signal processing (developing processing) on the lossless-compressed image data using the image developing conditions. Such an image processing apparatus can generate an RGB image by changing the image developing conditions.

However, in the case where RGB image data is generated by developing the lossless-compressed image data using the changed image developing conditions used in the image sensing operation, the conventional image processing apparatus does not make any change to the JPEG image incidental to the lossless-compressed image data. To be more specific, if a new image development condition is set by the image processing apparatus, the image obtained from the lossless-compressed image data and the changed image developing conditions is different from the JPEG image incidental thereto (for instance, in brightness, color saturation, hue and so on).

SUMMARY OF THE INVENTION

The present invention has been made in consideration of the above situation, and has as its object to, when a developing condition is changed, keep a state in which an image obtained by developing image data using the changed developing conditions matches with a JPEG image incidental thereto (image data of a less data amount than the image data to be developed).

According to the present invention, the foregoing object is attained by providing an image processing method for processing complex data including at least first image data, second image data of which data amount is less than the first image data, and a first developing condition for the first image data, the method comprising: setting a second developing condition for the first image data; generating third image data obtained by reflecting the second developing condition on the first image data, and then reducing its data amount; and updating the complex data with the second developing condition and the third image data.

According to the present invention, the foregoing object is also attained by providing an image processing apparatus for processing complex data including at least first image data, second image data of which data amount is less than the first image data, and a first developing condition for the first image data, the apparatus comprising: a setting unit that sets a second developing condition for the first image data; a generation unit that generates third image data by reflecting the second developing condition on the first image data, and then reducing its data amount; and an update unit that updates the complex data with the second developing condition.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIG. 8 is a diagram showing an example of data of model information shown in FIG. 7;

FIG. 10 is a diagram showing a data structure of added information at the time of image sensing operation shown in FIG. 7;

DETAILED DESCRIPTION OF THE PREFERRED EMBODIMENT

A preferred embodiment of the present invention will be described in detail in accordance with the accompanying drawings.

Figure 1:
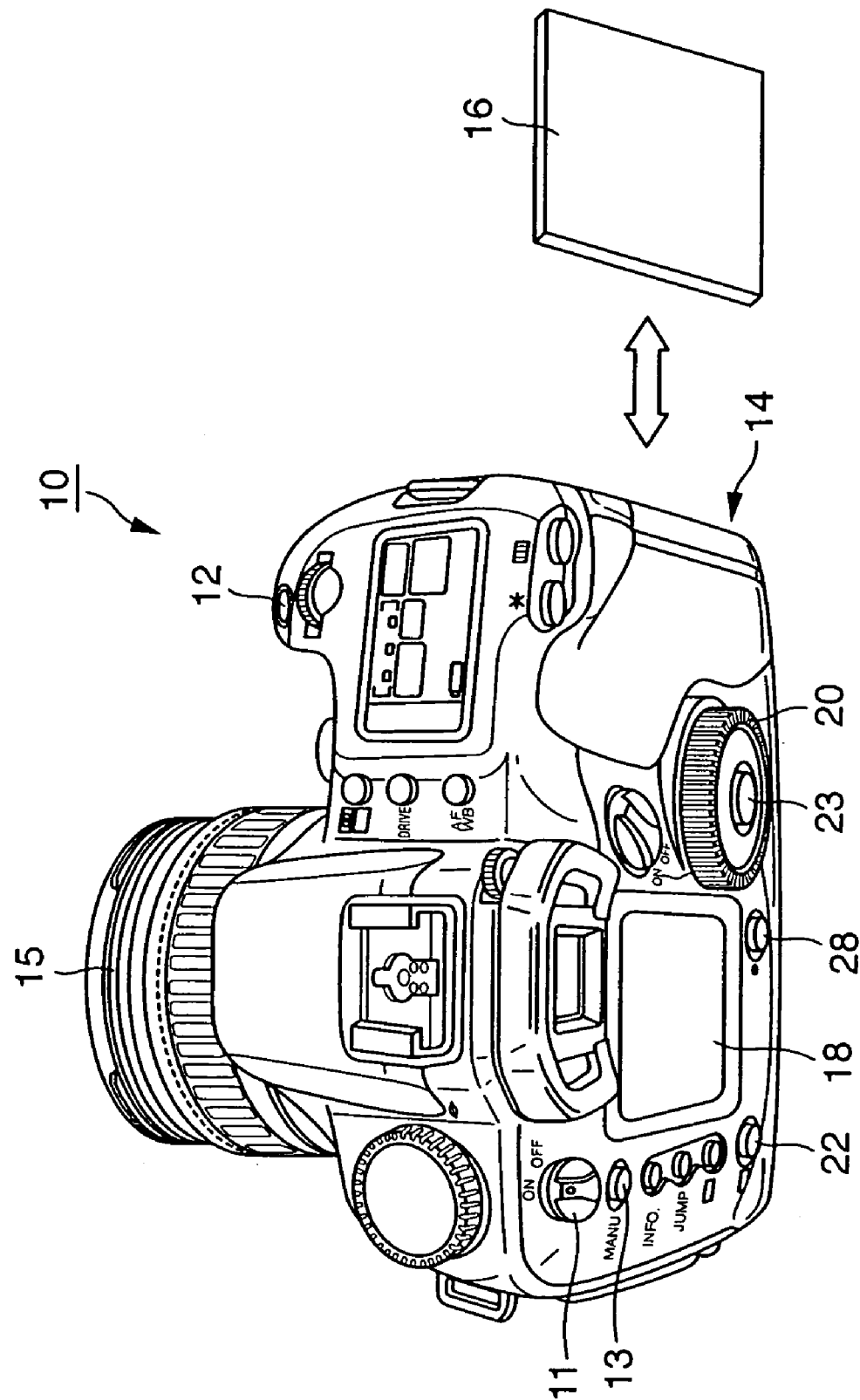
FIG. 1 is an external view of a digital camera according to an embodiment of the present invention.
Figure 2:
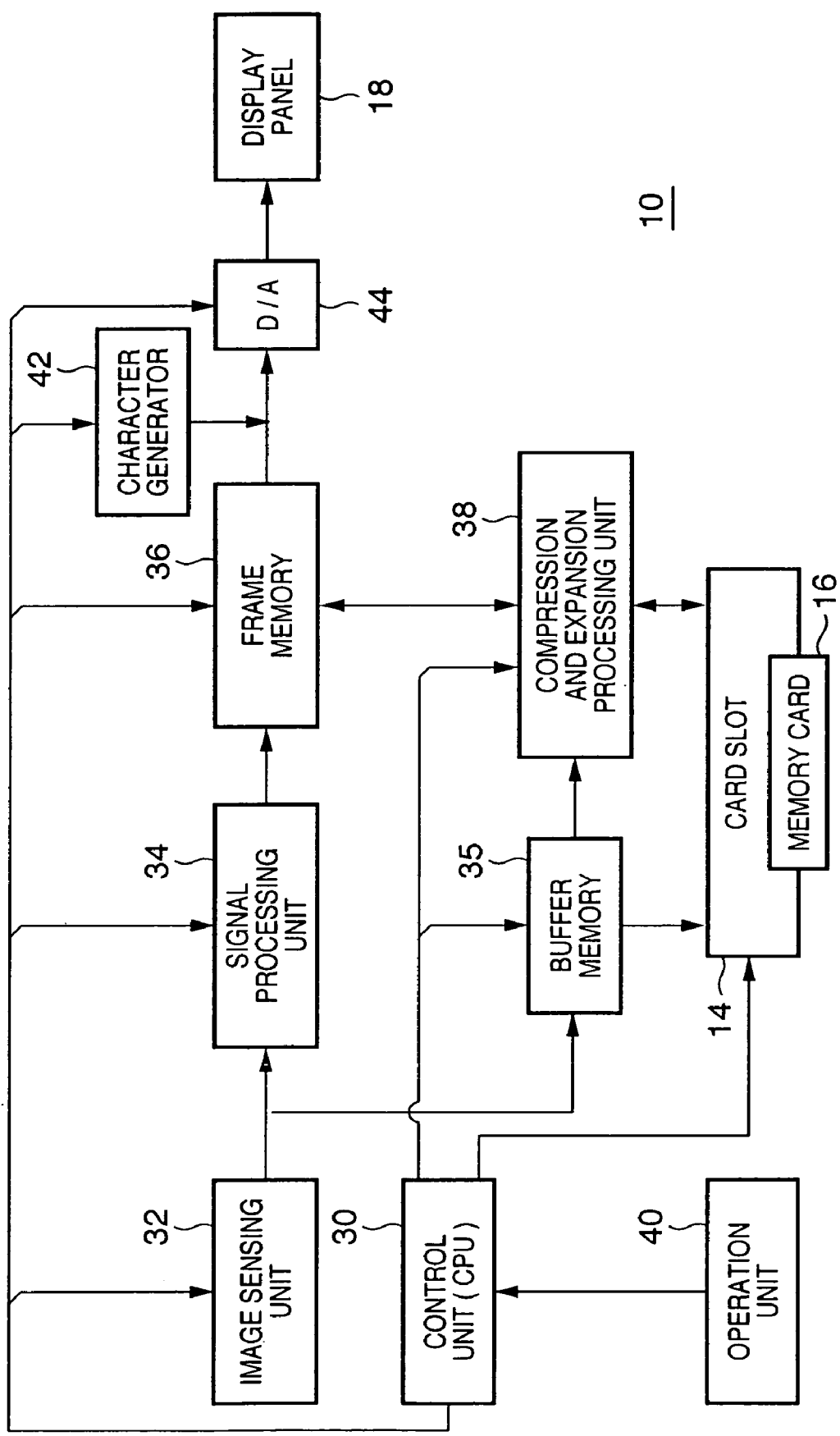
FIG. 2 is a block diagram showing a functional configuration of the digital camera according to the embodiment of the present invention.

FIG. 1 is an external view of an example of a digital camera 10 for generating image data used for an image processing apparatus according to the embodiment, showing a digital camera having an optical finder. FIG. 2 is a functional configuration diagram of the digital camera 10.

In FIG. 1, reference numeral 11 denotes a power switch; 12, a release button; 13, a menu button; 15, an image sensing lens; 18, a display panel such as an LCD; 20, a selection dial; 22, a playback button; 23, a selection button; and 28, an erasure button. Reference numeral 16 denotes a memory card, which is a storage medium such as a flash ROM, an EEPROM or the like having a nonvolatile semiconductor memory. The memory card 16 is detachably mounted on a card slot 14 (not shown) provided on the right side in FIG. 1.

In FIG. 2, reference numeral 30 denotes a control unit (CPU); 32, an image sensing unit; 34, a signal processing unit; 35, a buffer memory; 36, a frame memory; 38, a compression and expansion processing unit; 40, an operation unit; 42, a character generator; and 44 a D/A converter. The operation unit 40 includes the selection dial 20, playback button 22, selection button 23 and erasure button 28, and is capable of transferring user operation and setup contents to the control unit 30 and instructing the control portion 30 to operate.

The control unit 30 controls, inter alia, an image sensing process in the image sensing unit 32, a signal processing in the signal processing unit 34, and information reading and writing in the frame memory 36 according to an operational state of the selection dial 20, playback button 22, selection button 23 and erasure button 28 included in the operation unit 40. The control unit 30 should desirably comprise a microcomputer system and include a ROM for storing firmware to stipulate a control procedure of a microprocessor and various interfaces for connecting peripheral circuitry. The control unit 30 also has semiconductor memories such as a register and an RAM for temporarily storing various set values and variables. These memories may be used as work memories, and for instance, developing conditions mentioned later recorded on the memory card 16 may be read out to the work memories and undergo correction and modification on the work memories so as to speed up the process.

Figure 3:
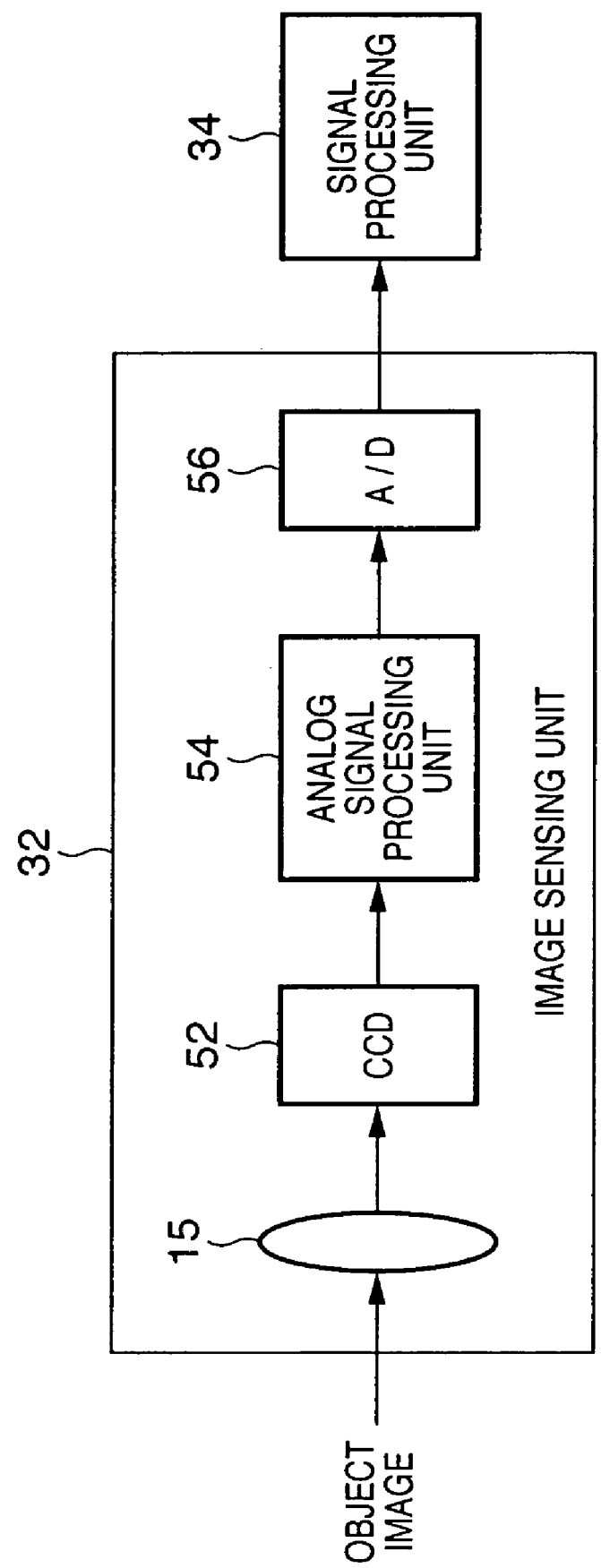
FIG. 3 is a block diagram showing a functional configuration of an image sensing unit according to the embodiment of the present invention.

FIG. 3 shows the functional configuration of the image sensing unit 32. As shown in FIG. 3, the image sensing unit 32 has the image sensing lens 15, a CCD 52, an analog signal processing unit 54 and an A/D converter 56.

The CCD 52 is an example of a solid-state image sensing device. The solid-state image sensing device is a semiconductor and integrated image sensing device, and in terms of structure, it has a group of pixels having functions of photoelectric conversion and charge accumulation two-dimensionally arranged on a semiconductor substrate. The solid-state image sensing device receives the light formed by image sensing lens 15, and accumulates charges generated by a photoelectric conversion action. The accumulated charges are scanned in the fixed order, and are read as electrical signals. As for the solid-state image sensing devices, there are an MOS image sensor, a CdS-Se contact type image sensor, an a-Si (amorphous silicon) contact type image sensor, a bipolar contact type image sensor and so on other than a CCD image sensor, and any of them may be used.

The camera 10 has an image sensing mode for recording a sensed image on the memory card 16 by pressing the release button 12, a playback mode for displaying an image recorded on the memory card 16, a setup mode for specifying and selecting various operating conditions and functions, and a communication mode for transferring information by connecting the camera 10 to a personal computer and so on, where each mode is selected by rotating the selection dial 20 while pressing the menu button 13.

The operation in the image sensing mode will be described first.

If the power switch 11 is turned on, an optical image of the object is incident on the CCD 52 via the image sensing lens 15. And if the release button 12 is pressed, the image of the object is converted into the electrical signals according to an amount of light received by the CCD 52 and outputted as an image signal representing a frame image under the control of the control unit 30. The image signal outputted by the CCD 52 undergoes an analog signal process such as gain adjustment or white balance in the analog signal processing unit 54, and are converted into a digital signal by the A/D converter 56 thereafter so as to be outputted. Hereafter, the digital signal outputted from the A/D converter 56 is called "RAW data." The outputted RAW data is temporarily stored in the buffer memory 35, and recorded on the memory card 16 mounted in the card slot 14. The RAW data is also supplied to the signal processing unit 34.

Figure 4:
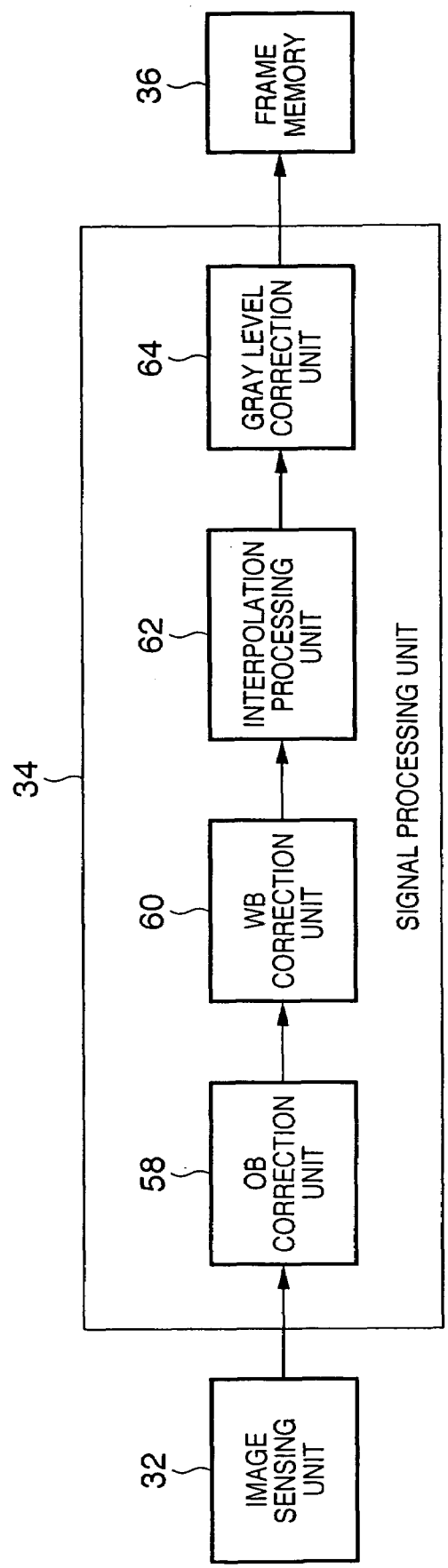
FIG. 4 is a block diagram showing a functional configuration of a signal processing unit according to the embodiment of the present invention.

FIG. 4 is a functional configuration diagram of the signal processing unit 34. The signal processing unit 34 has an OB (Optical Black) correction unit 58, a WB (White Balance) correction unit 60, an interpolation processing unit 62 and a gray level correction unit 64. The signal processing unit 34 has the RAW data inputted from the image sensing unit 32, and performs image adjustment such as brightness, color saturation, gray scale and color balance, and image interpolation and so on by digital operation. The RAW data is a signal of 12 bits per pixel for instance, and the signal processing unit 34 converts it into a signal of smaller number of bits such as 8 bits to suit a signal form displayed on the display panel 18 and outputs it.

The OB correction unit 58 subtracts a value of optical black from the RAW data for each of R, G, and B components. This is because the CCD 52 has a characteristic that its output level does not become zero even if no light enters, an offset value of the optical black is subtracted from an output signal for each channel of RGB so as to correct a signal level. The offset value of the optical black can be detected by the output level of the output signal of a light-shielded pixel provided on the CCD 52. The WB correction unit 60 adjusts a gain of the RAW data for each of R, G, and B components in order to adjust the white balance. The image signal inputted to the WB correction unit 60 is 12 bits for instance, and the image signal processed and outputted by the WB correction unit 60 is 10 bits. Next, the interpolation processing unit 62 performs known pixel interpolation, and creates RGB-point sequential image data. The gray level correction unit 64 corrects the gray scale of the RAW data. Data on the LUT is used for gray level correction. A 10-bit image signal inputted to the gray level correction unit 64 is converted into an 8-bit image signal for instance. The LUT used for the gray level correction by the gray level correction unit 64 may reflect an adjustment level of display brightness set up by the user.

Figure 5:
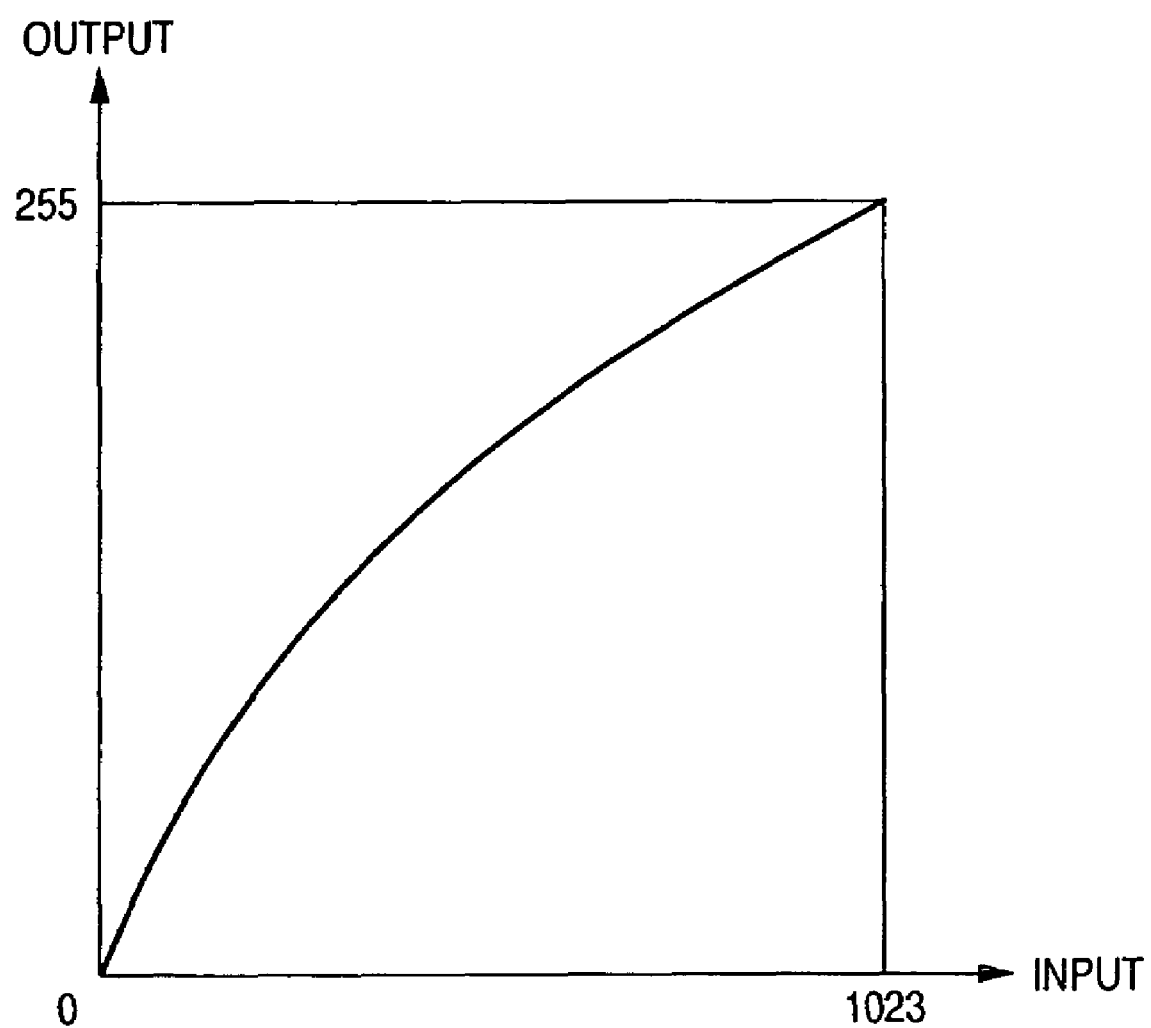
FIG. 5 is a diagram showing an input-output example of an LUT used for gray level correction according to the embodiment of the present invention.

FIG. 5 is a diagram showing an input-output example of the LUT used for gray level correction. The input signal before the gray level correction is the data of 1024 gray levels represented by 10 bits per pixel. The output signal after the gray level correction is the data of 256 gray levels represented by 8 bits per pixel. The pixel signal is converted from the 10-bit signal to the 8-bit signal by using the LUT prescribed in the graph in FIG. 5 so as to correct the brightness of the image. The image signal of which gray scale is corrected by the gray level correction unit 64 is stored in the frame memory 36.

The compression and expansion processing unit 38 reads the image data of one frame stored in the frame memory 36, and compression-encodes it at two kinds of compression rates according to an image quality mode specified by the control unit 30. As for compression-encoding, for instance, it uses the JPEG method whereby the image data is divided into 8×8 blocks and each block is orthogonally transformed to quantize its coefficient of transformation to be a Huffman code. For instance, it adaptively selects a quantization characteristic so that a data amount after the encoding becomes a predetermined length or less so as to compression-encode the image data of one frame. Here, it generates thumbnail image data compressed at the compression rate suitable for display on the display panel 18 and simulation image data compressed at the compression rate lower than that for the thumbnail image data. On operating in a playback mode described later, the compression and expansion processing unit 38 expands and decodes the compression-encoded data read from the memory card 16 and supplies it to the frame memory 36.

The generated thumbnail image data and simulation image data are recorded on the memory card 16 together with the RAW data stored in the buffer memory 35. Furthermore, it records on the memory card 16 the developing conditions including the parameters and LUT used for processing in each circuit of the signal processing unit 34 on generating the thumbnail image data and simulation image data in conjunction with the RAW data. As for a destination of storage, it is not limited to the memory card 16 but the information may be held by an SRAM backed up by a battery. It is also possible to use an information storage medium such as a flexible disk or an optical disk on which the information is magnetically or optically written and held. The processing conditions may be recorded either in text form or in binary form.

Here, a description will be given as to a setup procedure of adjustment parameters used for the display processing on the display panel 18 in the setup mode.

On pressing the menu button 13, a menu screen is displayed on the display panel 18. There is the setup mode for setting various parameters in the menu screen. On selecting it, the screen as shown in FIG. 6 is displayed on the display panel 18.

Figure 6:
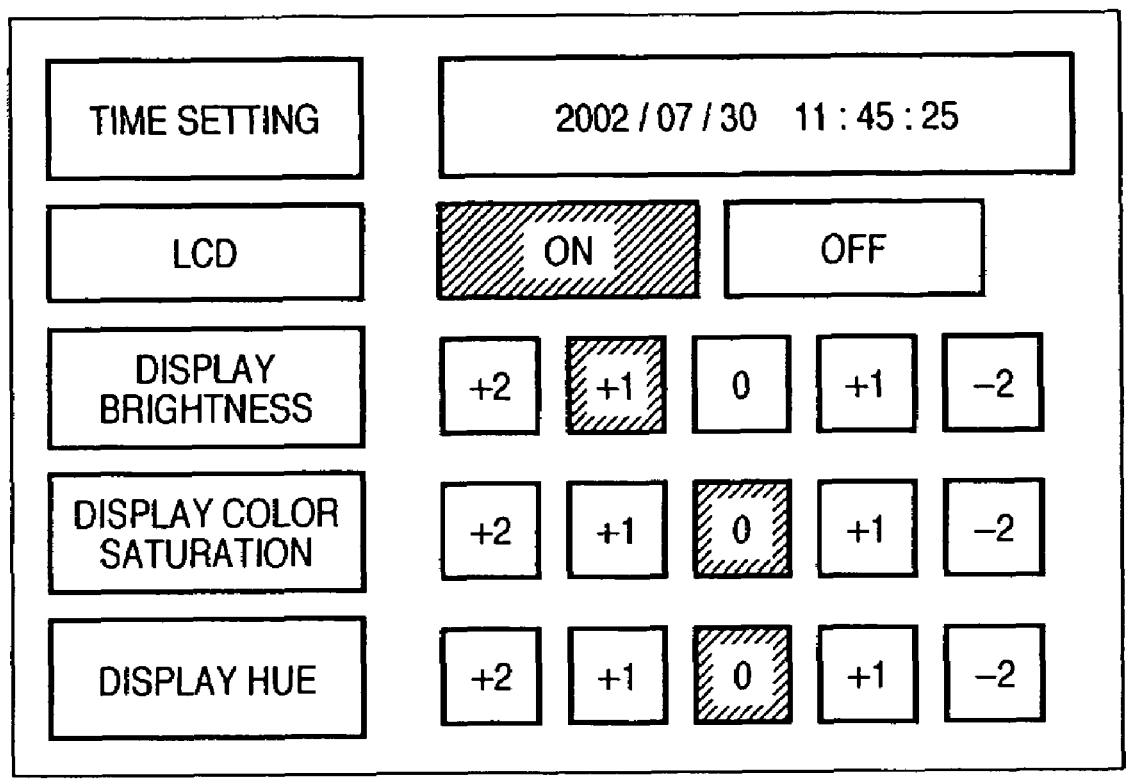
FIG. 6 is a diagram showing an example of a parameter setup screen displayed on a display panel of a digital camera according to the embodiment of the present invention.

FIG. 6 is a diagram showing an example of the screen for setting various parameters displayed on the display panel 18 of the camera 10. In this example, it is possible, by using the selection button 23 and selection dial 20, to select whether or not to display the sensed image on the display panel 18 and fine-tune the brightness, color saturation and hue of the sensed image (a simulation image in this case) when displayed on the display panel 18 at five stages according to the user's preference. In addition, sharpness and so on may be set up as a desired adjustment parameter. The above parameters may be set up as to each sensed image. The brightness, color saturation and hue set up here are used by the D/A converter 44 when displaying the image on the display panel 18. While the adjustment parameters are set up before sensing an image in the image sensing mode, the adjustment parameters used for displaying an image such as display brightness may be set up either before the image sensing or when reproducing and displaying the sensed image.

Figure 7:
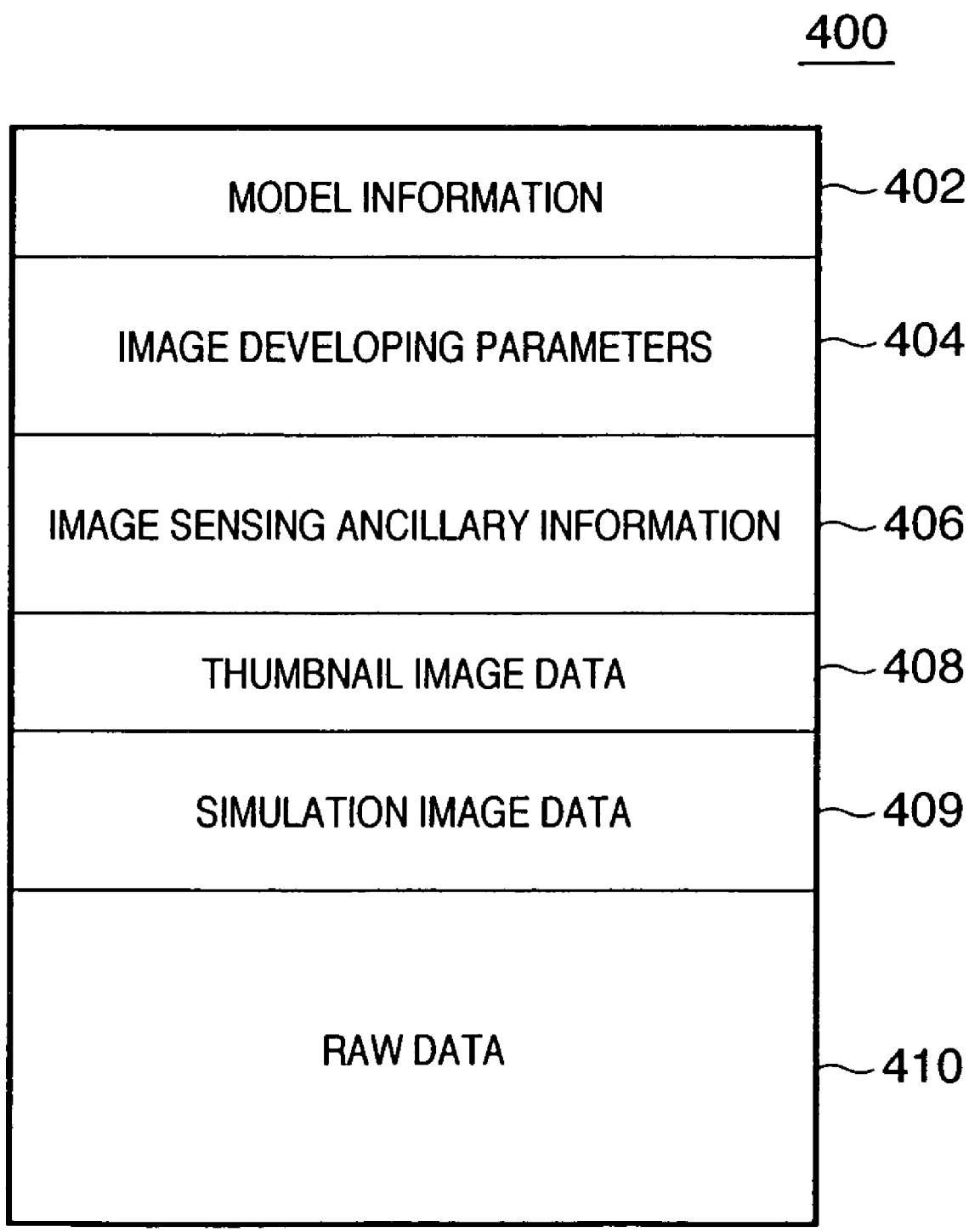
FIG. 7 is a diagram showing a data format of image data according to the embodiment of the present invention.

FIG. 7 is an explanatory diagram of a data format of image data 400 to be recorded on the memory card 16. The image data 400 stores model information 402, an image processing parameters 404 which are the developing conditions, image sensing ancillary information 406, thumbnail image data 408 and simulation image data 409 as image ancillary information together with RAW data 410. The image ancillary information can be recorded in tag form of the Exif format standard and so on.

Figure 8:
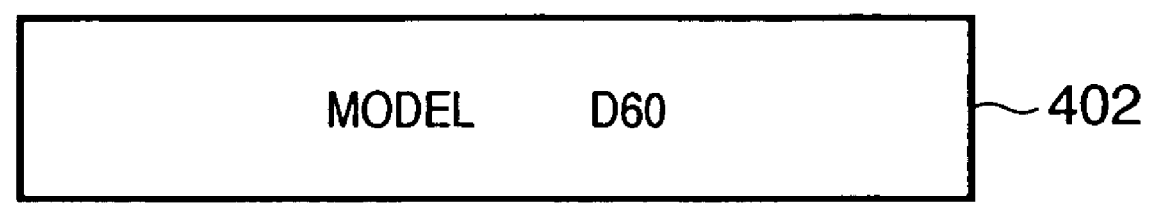

FIG. 8 is a diagram showing an example of the data on the model information 402. In the example shown in FIG. 8, "model D60" is stored as the information for identifying the model of the camera 10. As for the model information, the information indicating characteristics of the image sensing unit 32 of the camera 10 such as the number of pixels, pixel arrangement, an analog signal processing method and the number of A/D conversion bits may be stored in addition to the model name.

Figure 9:
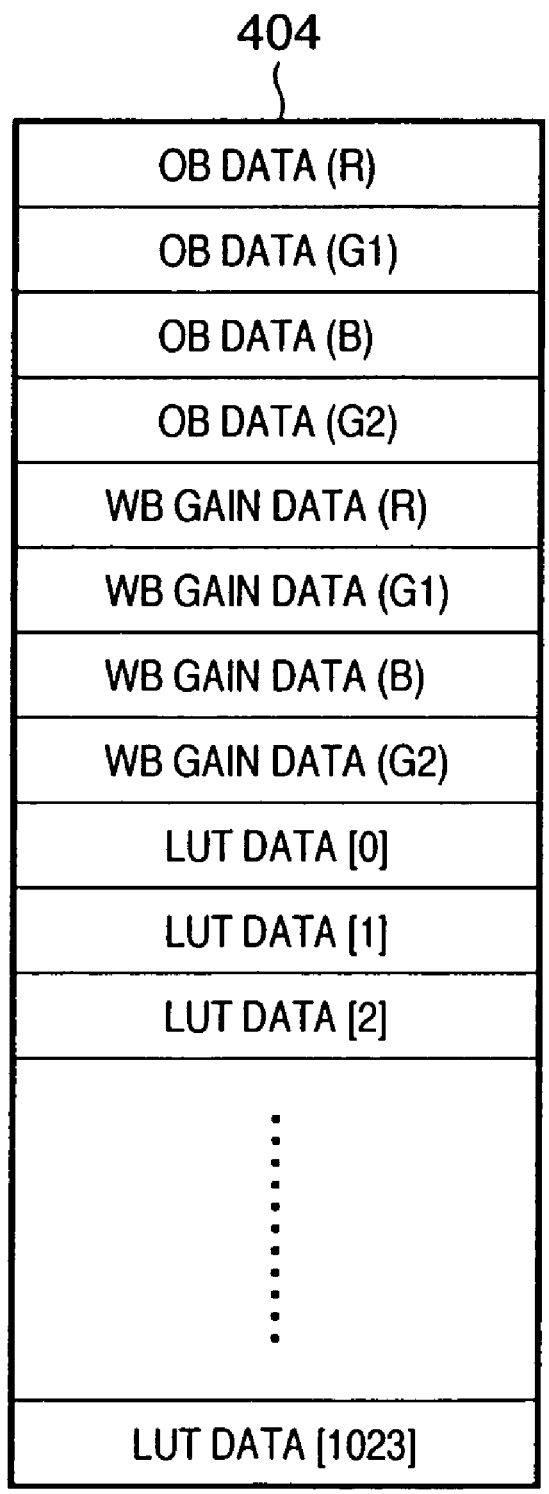
FIG. 9 is a diagram showing a data structure of an image developing parameter shown in FIG. 7.

FIG. 9 is a diagram showing the data structure of the image developing parameters 404. In the case where the CCD 52 has a color filter of Bayer arrangement, OB correction data storing the values of the optical black (OB) to be subtracted from the RAW data for each of R, G, and B components, WB gain data storing the gains to be given to the RAW data for each of R, G, and B components for the sake of color balance, and LUT data storing a conversion table of the gray level correction applied to the RAW data are stored. As described above, these image developing parameters are image correction parameters used in the OB correction unit 58, WB correction unit 60 and gray level correction unit 64 of the signal processing unit 34. In the signal processing unit 34, these image correction parameters are used when processing the RAW data outputted from the image sensing unit 32 and generating the thumbnail image data 408 and simulation image data 409 in the image sensing mode. It is possible to further store a conversion parameter between RGB data and Y/C data as the image developing parameters 404.

As described above by referring to FIG. 6, there are also the image developing parameters to be set up by a user on image sensing, where the brightness, color saturation, sharpness, hue and so on set up at desired values or levels are stored.

FIG. 10 is a diagram showing the data structure of the image sensing ancillary information 406. As for the image sensing ancillary information 406, the information indicating a date of image sensing and the conditions on the image sensing such as a shutter speed, an aperture value and an exposure mode are stored. As for the exposure modes, there are standard mode, shutter speed priority mode, aperture priority mode and so on.

The thumbnail image data 408 is used in order to promptly display the image sensing result on the display panel 18. The simulation image data 409 is used as the simulation image when changing the image developing parameters 404 in the image processing apparatus mentioned later.

Figure 11:
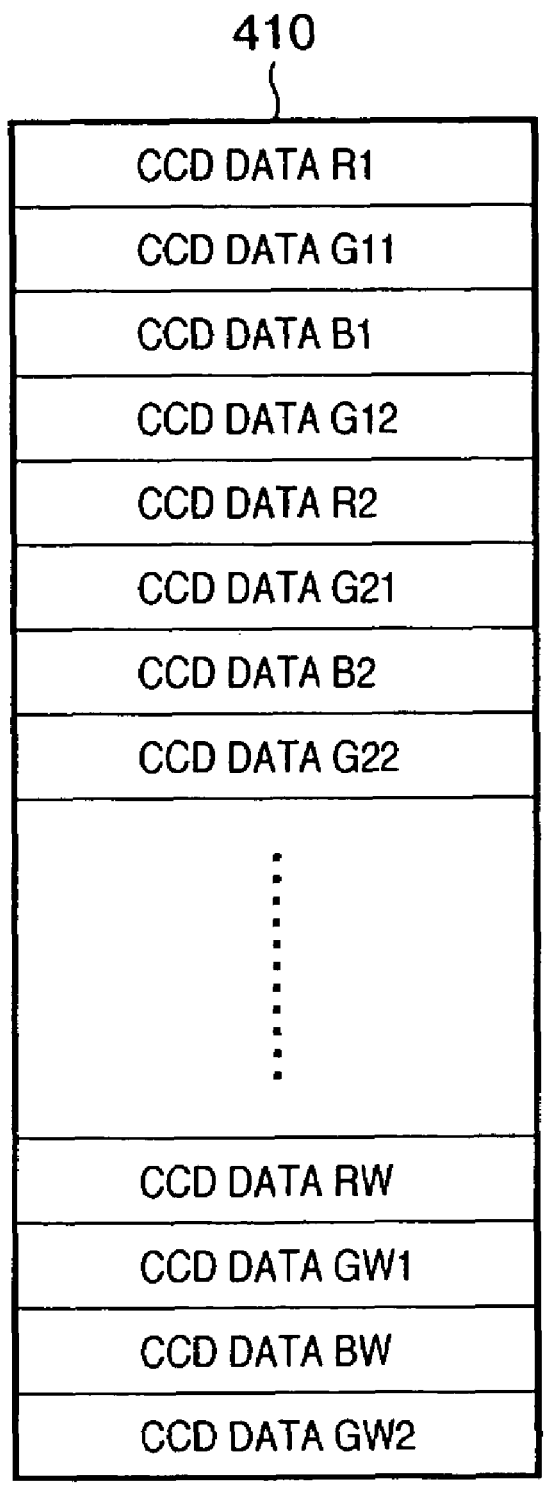
FIG. 11 is a diagram showing a data structure of RAW data shown in FIG. 7.

FIG. 11 is a diagram showing the data structure of the RAW data 410. In the case of the RAW data, the output signals of the image sensing unit 32 stored in the buffer memory 35 are sequentially stored in a non-compressed state or after being encoded according to the number of pixels, pixel arrangement and RGB components of the CCD.

Next, the operation in the playback mode will be described.

On pressing the playback button 22, the playback mode for displaying the image recorded on the memory card 16 is set as described above, and the image to be reproduced can be selected by turning the selection dial 20.

In the playback mode, the thumbnail image data of the selected image is read from the memory card 16 mounted in the card slot 14 under the control of the control unit 30, and is expanded by the compression and expansion processing unit 38. And the expanded thumbnail image data is deployed in the frame memory 36, and is converted into an analog signal by the D/A converter 44 to be displayed on the display panel 18.

In this case, the control unit 30 can control the character generator 42 and D/A converter 44 to display the information such as various characters and icons generated by the character generator 42 on the display panel 18 along with the thumbnail image read from the memory card 16. In the case where the adjustment parameters for display are set up, the brightness, color saturation and so on are displayed based on the adjustment parameters. To be more precise, the image sensing ancillary information 406 is read from the image data 400, and character codes representing the information included in the image sensing ancillary information 406 are sent to the character generator 42 together with the character codes representing a current operation mode. The character generator 42 has a character set corresponding to the inputted character code readably stored, and outputs the character set in output timing corresponding to a desired position of the display panel of the display unit 18. The outputted character set is combined with the thumbnail image data repeatedly read from the frame memory 36 to display character images in or around the reproduced image. Such character information may be displayed in a different area from the image display area of a monitor. It is also possible to combinedly display the codes representing graphic data such as pictorial symbols and the image represented by bitmap data, not limited to the characters, on the display screen.

Figure 12:
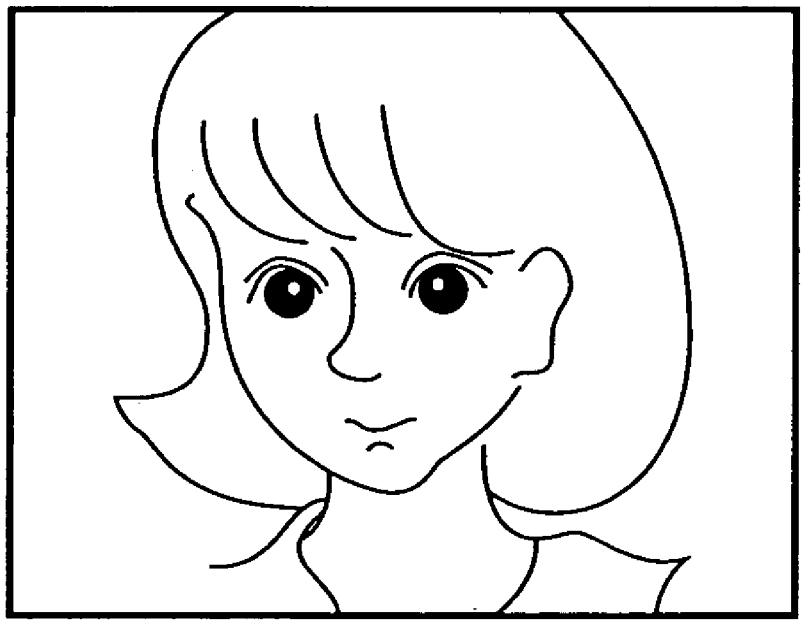
FIG. 12 is a diagram showing an example of a reproduced image displayed on a display panel according to the embodiment of the present invention.

FIG. 12 shows an example wherein characters, such as the "playback mode" indicating that the current mode is the playback mode and the "IMG00003.RAW" indicating the name of the currently reproduced image, generated by the character generator 42 are combined in the upper part of the reproduced image, and displayed on the display panel 18 together with the reproduced image. The date and time when it was recorded on the memory card 16 and the current date and time according to a timekeeping function of a calendar clock included in the control unit 30 are displayed per display setup on the lower right part of the display screen 18.

When a frame erasure mode is set by the playback button 22, selection button 23 and selection dial 20, the control unit 30 reproduces and displays the desired image data according to rotative operation of the selection dial 20. On detecting the operation on the erasure button 28, the control unit 30 erases the image data in the memory card 16 storing the displayed image. Further, the control unit 30 erases all the image data when an all-frame deletion mode is set up by the playback button 22, selection button 23 and selection dial 20.

Next, a description will be given as to the image processing apparatus according to this embodiment for processing the image data stored as described above.

Figure 13:
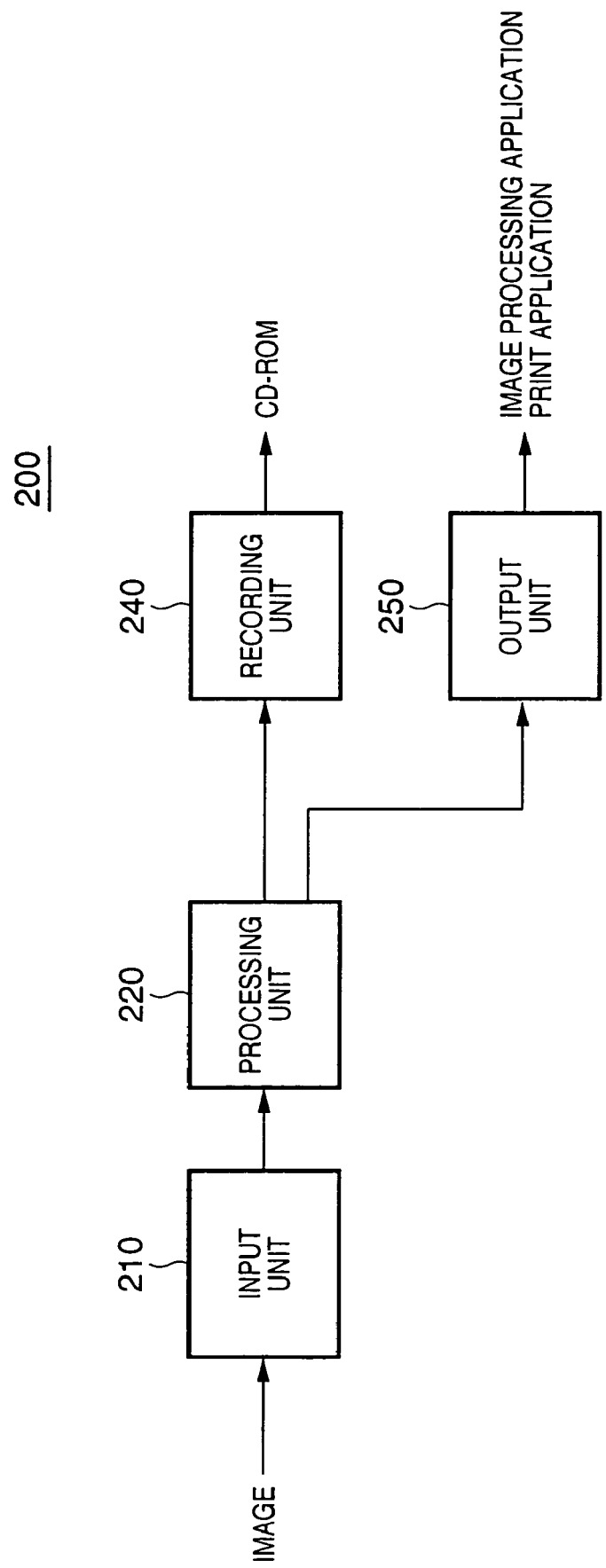
FIG. 13 is a block diagram showing a configuration of an image processing apparatus according to the embodiment of the present invention.

FIG. 13 is a block diagram of an image developing system 200 for developing a digital image as an example of the image processing apparatus according to the present invention.

The image developing system 200 according to this embodiment has an input unit 210, a processing unit 220, a recording unit 240 and an output unit 250.

The input unit 210 inputs the image data 400 (refer to FIG. 7) including the RAW data 410 and image sensing ancillary information 406. In the case of inputting the image data sensed by the digital camera 10 and so on, a reader for reading the image data from a detachable recording medium such as a semiconductor memory card is used as the input unit 210. In the case of reading the image data from the flexible disk, MO, CD-ROM and so on, a flexible disk drive, an MO drive, a CD-ROM drive and so on are used as the input unit 210 respectively.

Figure 14:
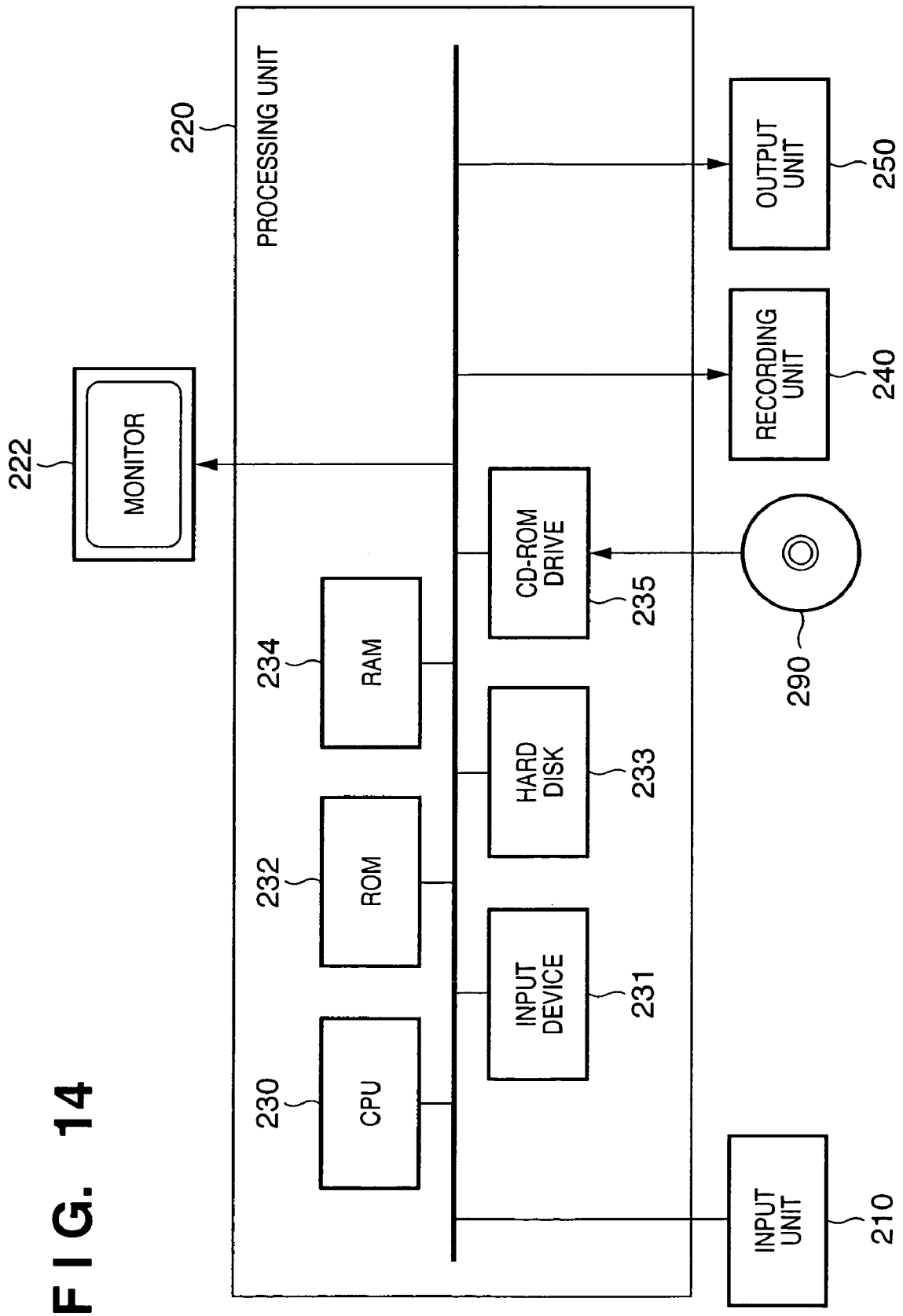
FIG. 14 is a block diagram showing a configuration of a processing unit shown in FIG. 13.

FIG. 14 shows a hardware configuration of a processing unit 220 for developing the RAW data. As for the processing unit 220 according to this embodiment, an electronic computer such as a personal computer or a work station is used.

In FIG. 14, a CPU 230 operates based on a program stored in an ROM 232 and an RAM 234. The data is inputted by the user via an input device 231 such as a keyboard or a mouse. A hard disk 233 stores the data such as image data and the program for operating the CPU 230. A CD-ROM drive 235 reads the data and/or program from a CD-ROM 290, and provides it to at least one of the RAM 234, hard disk 233 and the CPU 230. It is also possible to have it installed from the CD-ROM 290 to the hard disk 233 to be read to the RAM 234 and executed by the CPU 230.

Figure 15:
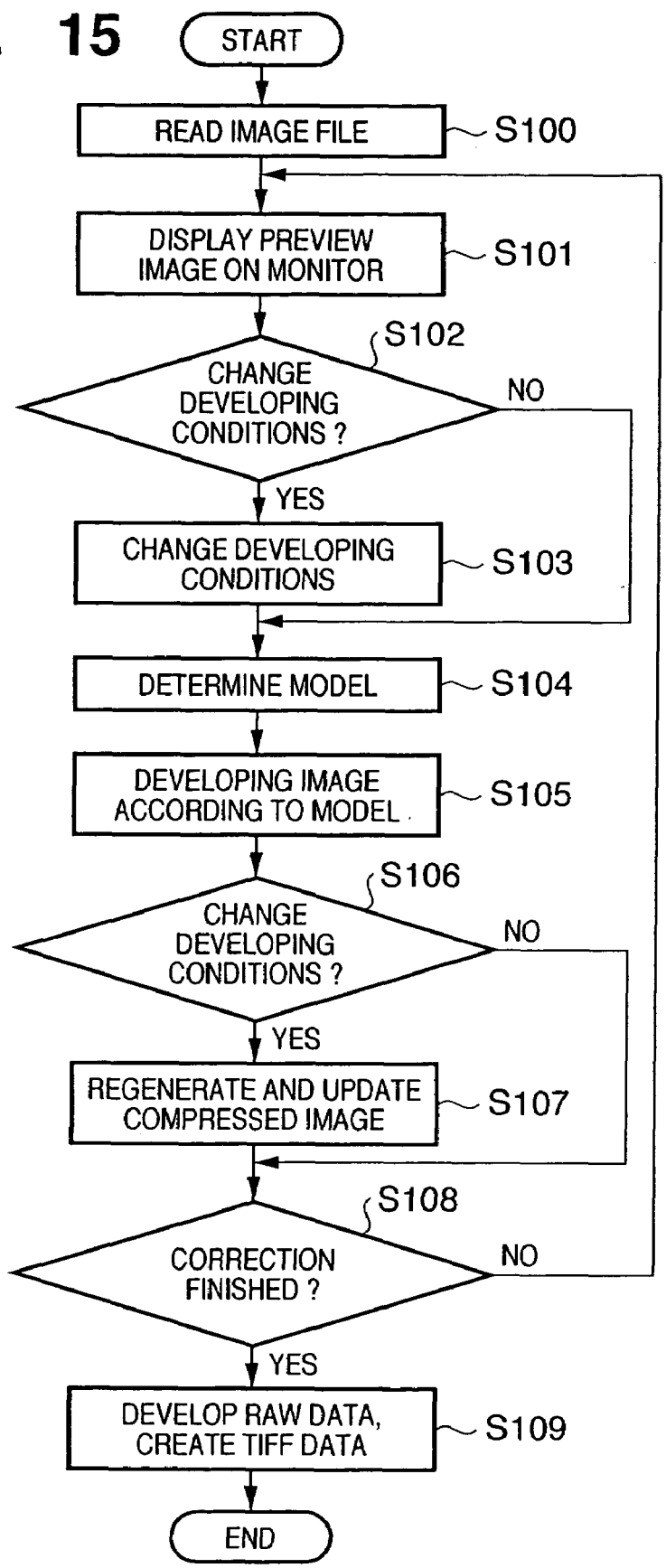
FIG. 15 is a flowchart of image developing processing performed by the processing unit according to the embodiment of the present invention.

FIG. 15 is a flowchart of the image correction process performed by the processing unit 220 according to the embodiment of the present invention. The operation of the image processing system 200 will be described according to FIG. 15 below.

First, in step S100, the input unit 210 reads an image file 400. As described above by referring to FIG. 8, the image file 400 includes the RAW data 410, image ancillary information incidental to the RAW data such as image developing parameters 404 and image sensing ancillary information 406, thumbnail image data 408 and simulation image data 409.

Next, in step S101, the CPU 230 reads the simulation image data of the image data, and displays it as the simulation image on a monitor 222. It is possible, by displaying the simulation image, to display the image in a shorter time than displaying the image based on the RAW data.

The user can check the simulation image displayed on the monitor 222 to determine whether or not it is the image of desired brightness and color. In the case where the image should be corrected, change of the developing conditions is ordered by the input device 231. As for this, it is possible, for instance, to order the change of the processing conditions by using the screen shown in FIG. 16.

Figure 16:
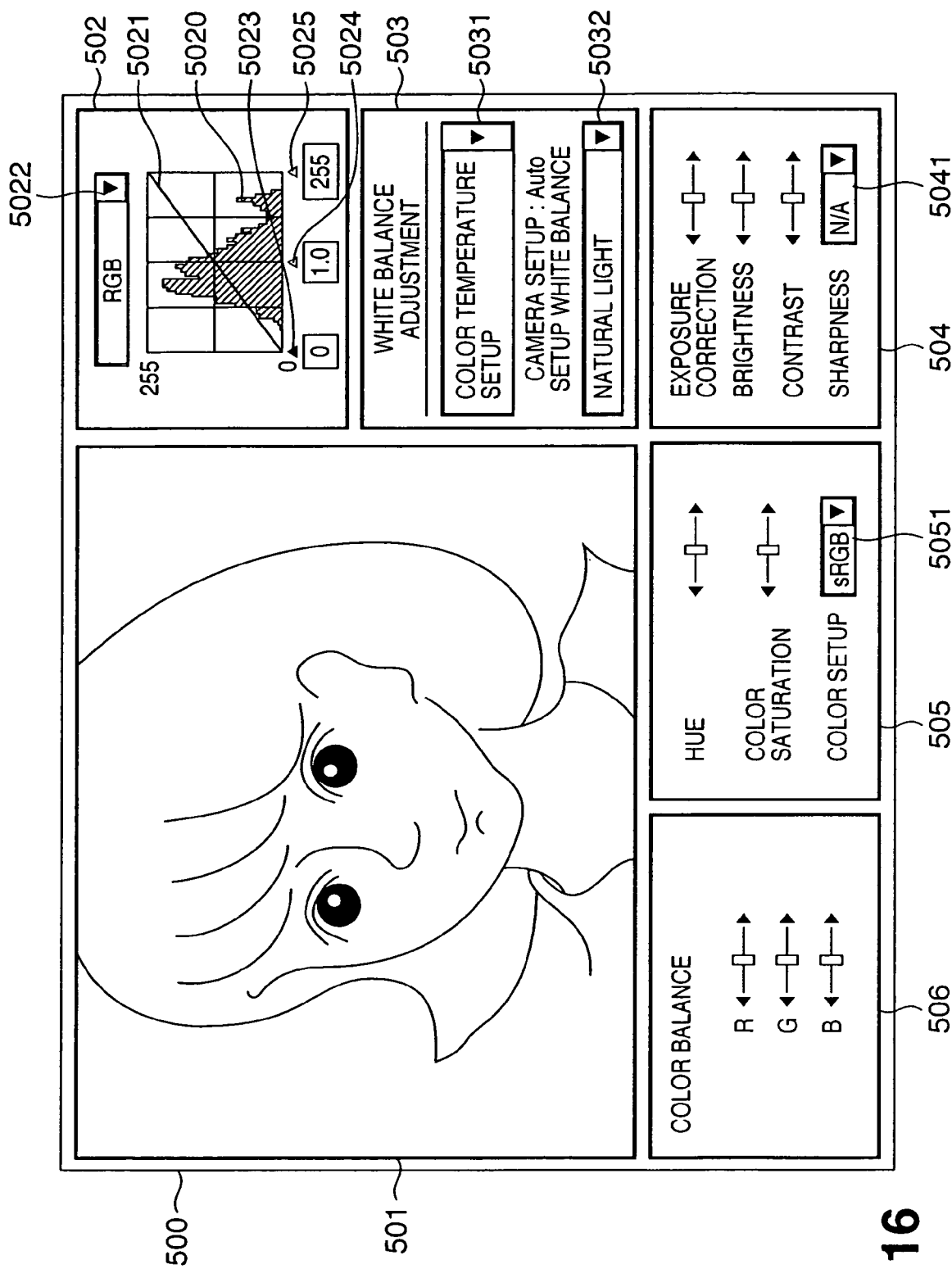
FIG. 16 is a diagram showing an example of an operation screen for changing a developing condition according to the embodiment of the present invention.

FIG. 16 shows an example of the screen displayed on the monitor 222 to describe an example of a developing condition change process by the user.

The user sets up the image developing parameters 404 which are the processing condition of the RAW data by using the input device 231 placed in the surroundings while watching a simulation compressed image 501 displayed on the monitor screen 500.

Reference numeral 502 denotes a tone curve pallet whereby the gray scale of the image can be adjusted by grabbing and deforming a tone curve 5021 with a mouse cursor (not shown).

Reference numeral 5020 denotes a histogram located in the background of a tone curve 5021 for performing the gray level correction of the image by adjusting the level while moving a black point 5023, a halftone point 5024 and a white point 5025 to the right and left with the mouse cursor.

A channel menu 5022 is placed in the upper part of the tone curve pallet 502, and is capable of selecting a correction channel. A master curve can be adjusted by selecting the RGB, and the gray level of each individual color can be adjusted by selecting any of the R, G and B channels.

Reference numeral 503 denotes a white balance adjustment pallet. On selecting "Color temperature setup" from a popup menu 5031, the color temperature setup made by the camera on sensing the image is displayed so that, for instance, the color temperature to be reset such as "natural light," "lamp light," "fluorescent light" and so on can be selected and set up from the pull-down menu of reference numeral 5032.

On selecting "Gray point" from a pull-down menu 5031, the mouse cursor becomes a dropper cursor on the simulation compressed image 501 so that the white balance will be applied if clicked on a portion which is a sample value of the gray point on the image.

Reference numeral 504 denotes an image adjustment pallet, and is capable of adjusting exposure correction, brightness and contrast by holding a slide bar with the mouse cursor.

As for the sharpness, appropriate sharpness can be selected from "N/A," "1" "2" and so on indicating steps of the sharpness from the pull-down menu 5041 while watching the simulation compressed image 501.

Reference numeral 505 denotes a pallet for performing color adjustment, and is capable of adjusting the hue and color saturation by moving the slide bar to the right and left with the mouse cursor while watching the simulation compressed image 501. The color gamut such as "sRGB" can be selected from a color setup pull-down menu 5051.

Reference numeral 506 denotes a color balance pallet, which is capable of adjusting the brightness of each color by moving each slider of R, G and B to the right and left with the mouse cursor.

The image developing parameters 404 as the developing conditions are determined by performing the user operation on the screen as described above.

In step S102, whether or not the processing conditions are changed by the user is determined. If not changed, the process moves on to step S104. If changed, the process moves on to step S103 and replaces the image developing parameters 404 based on the set-up developing conditions. It is possible, without replacing the image developing parameters 404, to store the parameter according to the changed developing conditions in another memory area and preferentially use the changed developing conditions. In this manner, it is possible to return to the image developing parameters 404 set in the image sensing operation according to the user's instruction.

In step S104, the CPU 230 determines a camera model having generated the image data according to the model information 402 of the image data 400. In step S105, it performs the process according to the camera model determined in step S104 based on the developing conditions. For instance, in the case where the model is D60 which is the digital camera 10 shown in FIG. 8, the processing unit 220 develops the RAW data by using the developing conditions set up on image sensing if the developing conditions are not changed (NO in step S102) and by using the developing conditions set up in step S103 if the developing conditions are changed (YES in step S102). Thus, in the case where the brightness, color saturation, hue, tone, sharpness and so on are included in the developing conditions in steps S102 and S103, desired adjustment levels thereof will be reflected on the development. For instance, if the brightness is specified as +1, it adjusts the LUT given as the image developing parameter to be brighter than usual, then the developing process is performed. In step S105, the OB correction, WB correction, interpolation and gray level correction processes, basically the same processes as the image correction process in the signal processing unit 34 of the camera 10 are performed. The LUT for performing the gray level correction of the RAW data is created by reading the LUT from the image developing parameter and combining the changed LUT by the input unit 210.

If the image processing for the RAW data is finished in step S105, it moves on to step S106 and determines whether or not the developing conditions were changed. If changed, the process moves on to step S107 where the simulation image and thumbnail image are regenerated from the RAW data processed in the step S105. Further, the image data read and stored in step S100 is updated with the regenerated simulation image data and thumbnail image data and furthermore the changed developing conditions, and outputted to the recording unit 240. The recording unit 240 records the image data outputted by the processing unit 220 on the detachable recording medium. As for the recording medium, inter alia, an optical recording medium such as the writable CD-ROM or DVD, a magnet-optical recording medium such as the MO, or a magnetic recording medium such as the flexible disk is used. As for the recording unit 240, the CD-R drive, DVD drive, MO drive, flexible disk drive or the like is used. The recording unit 240 may also record the image data on the semiconductor memory such as a flash memory or a memory card. It is also feasible to render the recording unit 240 as the same apparatus as the input unit and record it on an overwritable recording medium.

In the case where the processing conditions were not changed (NO in step S106), the process moves on to step S108.

In step S108, whether or not the image displayed on the monitor 222 has become the image desired by the user, that is, whether or not the correction has been finished is determined. In the case where the user further makes a correction, the process returns to the step S101 and displays the current simulation image so as to repeat the above processes.

In the case where the correction has been finished (YES in the step S108), the image data processed in step S109 is sent to the output unit 250. The output unit 250 sends the developed image data (TIFF image data for instance) outputted by the processing unit 220 to another image processing application such as retouching software or a print application for instance.

According to the above configuration, it is possible, in the case of reading and image-processing the RAW data, to have the image quality fine-tuned by the user using the personal computer. For instance, fine corrections such as gray level, brightness, color saturation, color balance and hue corrections are possible.

As described above, in the case where the RAW data as well as the developing parameter, compressed image data and information on the model having created the RAW data are recorded by an image sensing apparatus, the compressed image data is used for display instead of the RAW data when reproducing the sensed image on the monitor of the computer. And in the case where the developing conditions were changed, the compressed image data reflecting the changed developing conditions is generated and displayed as a simulation image. Thus, the RAW data of multiple bits and good image quality is processed using the desired developing conditions while the compressed image is displayed on the monitor so that the user can promptly grasp the change in the image.

It should be noted that the latest simulation image (or thumbnail image) to which changed developing conditions incidental to the RAW data are reflected is displayed. However, in a case of additionally recording the developing conditions as they are changed as described above, or regenerated simulation image/images on the basis of the changed developing conditions in another memory area, data indicative of each change is added as a history of change. In this case, it is possible to configure the present invention so that a list of the changed developing conditions incidental to the RAW data and/or thumbnail image/images may be displayed, the user can select any from the list.

Furthermore, according to the image processing apparatus of the present invention, the RAW data has the simulation image data and the developing conditions incidental thereto, and it is possible to promptly check the results of changing the developing conditions with the simulation image. Therefore, in the case of changing the developing conditions, it is not necessary to process and check the subject RAW data each time as long as the changed processing conditions are held, and it is possible to identify the image type of the subject image data and perform the developing processing by means of batch processing so as to improve productivity of the developing processing.

As for the above embodiment, the cases where the above operation is performed by the operation of the CPU 230 based on the program stored in the CD-ROM 290, ROM 232 and RAM 234. It is also possible, however, to implement the processing unit 220 with an electronic circuitry as hardware.

In the case of implementing it by utilizing the program, the storage medium for storing the program code in this case may be, inter alia, the flexible disk, hard disk, ROM, RAM, magnetic tape, nonvolatile memory card, CD-R, DVD, optical disk, magnet-optical disk or MO other than the CD-ROM 290. In that case, the program itself constitutes the present invention.

All the above plurality of compressed images were described as JPEG image data. However, the simulation image may be a thinned-out image of the RAW data. As the thinned-out image can be instantly developed on the developing conditions incidental to the RAW data, the simulation image can be promptly displayed.

The thumbnail image and simulation image which are two types of compressed images of different compression rates were used. However, it is not limited to two types, but the effect of this embodiment can be expected if at least one type of the compressed image is stored together with the RAW data.

According to the above description, the image data sensed by the image sensing apparatus is stored in the recording medium, and the image processing apparatus read the image data and the developing conditions from the recording medium. However, it is also possible to have communication between the image sensing apparatus and the image processing apparatus so as to send and receive the image data. To have communication between the image sensing apparatus and the image processing apparatus, communication specifications such as USB, RS-232C, Ethernet, Bluetooth, IrDA and IEEE1394 may be used.

Furthermore, the image sensing apparatus and the image processing apparatus may be constituted in the same apparatus.

According to the above description, the JPEG data is 8-bit data, that is, the data of a smaller number of bits than CCD-RAW data, and so a discontinuous gray level skip arises due to the gray level correction. However, it is possible to use the same number of bits as the RAW data, that is, 12-bit JPEG data for instance so as to prevent the gray level skip.

As for this embodiment, uncompressed image data is used as the RAW data. However, it may also be the lossless-compressed image data. Further, the RAW data may be A/D converted image data, obtained from the image sensing unit, which has not undergone at least any one of white balance processing, color separation processing of separating the image data to a luminance signal and color signals, and color interpolation from color plane data.

The present invention is not limited to the above embodiments and various changes and modifications can be made within the spirit and scope of the present invention. Therefore to apprise the public of the scope of the present invention, the following claims are made.

What is claimed is:

1. An image processing method for processing complex data including at least first image data obtained by sensing an object, a first developing condition, and second image data obtained by reducing data amount of developed first image data developed based on said first developing condition, said method comprising:
    setting a second developing condition for said first image data;
    developing said first image data based on said second developing condition;
    generating third image data by reducing a data amount of developed first image data developed based on said second developing condition;
    updating said complex data with said second developing condition and said third image data without changing said first image data; and
    managing said updated complex data by correlating said second developing condition and said third image data with said first image data, said second image data and the first developing condition.

2. The image processing method according to claim 1 further comprising:
    displaying said second image data; and
    displaying said third image data in place of said second image data.

3. The image processing method according to claim 1 further comprising outputting said developed first image data.

4. The image processing method according to claim 1, wherein, in said updating, said second image data is replaced by said third image data.

5. The image processing method according to claim 1, wherein, in said updating, said first developing condition is replaced by said second developing condition.

6. The image processing method according to claim 1, wherein, in said updating, said third image data is added to said complex data.

7. The image processing method according to claim 6 further comprising displaying a list of a plurality of images of which data amounts are respectively less than that of the first image data included in said complex data.

8. The image processing method according to claim 1, wherein, in said updating, said second developing condition is added to said complex data.

9. The image processing method according to claim 8 further comprising displaying a list of a plurality of developing conditions included in said complex data.

10. The image processing method according to claim 1, wherein said first image data is non-compressed image data.

11. The image processing method according to claim 1, wherein said first image data is lossless-compressed image data.

12. The image processing method according to claim 1, wherein said second and third image data is lossy-compressed image data.

13. A computer-readable medium storing a computer program for realizing the image processing method according to claim 1.

14. The image processing method according to claim 1 further comprising displaying said third image data preferentially to said second image data.

15. An image processing apparatus for processing complex data including at least first image data obtained by sensing an object, a first developing condition, and second image data obtained by reducing data amount of developed first image data developed based on said first developing condition, said apparatus comprising:
    a setting unit that sets a second developing condition for said first image data;
    a developing unit that develops said first image data based on said first or second developing condition;
    a generation unit that generates third image data by reducing a data amount of developed first image data developed by said developing unit based on said second developing condition;
    an update unit that updates said complex data with said second developing condition and said third image data without changing said first image data; and
    a managing unit that manages said updated complex data by correlating said second developing condition and said third image data with said first image data, said second image data and the first developing condition.

16. The image processing apparatus according to claim 15 further comprising:
    a display unit that displays said second image data and;
    a display update unit that replaces said second image data with said third image data to be displayed on said display unit.

17. The image processing apparatus according to claim 15 further comprising an output unit that outputs said first image data developed by said developing unit.

18. The image processing apparatus according to claim 15, wherein said update unit replaces said second image data with said third image data.

19. The image processing apparatus according to claim 15, wherein said update unit replaces said first developing condition with said second developing condition.

20. The image processing apparatus according to claim 15, wherein said update unit adds said third image data to said complex data.

21. The image processing apparatus according to claim 20, further comprising a display unit that displays a list of a plurality of image data, wherein a data amount of each of said plurality of image data is less than said first image data included in said complex data.

22. The image processing apparatus according to claim 15, wherein said update unit adds said second developing condition to said complex data apart from said first developing condition.

23. The image processing apparatus according to claim 22, further comprising a display unit that displays a list of a plurality of developing conditions included in said complex data.

24. The image processing apparatus according to claim 15, wherein said first image data is non-compressed image data.

25. The image processing apparatus according to claim 15, wherein said first image data is lossless-compressed image data.

26. The image processing apparatus according to claim 15, wherein said second and third image data is lossy-compressed image data.

27. The image processing apparatus according to claim 15, wherein said image processing apparatus is an image sensing apparatus.

28. A computer-readable medium storing a computer program for executing the image processing apparatus according to claim 15.

29. The image processing apparatus according to claim 15 further comprising a display update unit that displays said third image data preferentially to said second image data.

* * * * *

UNITED STATES PATENT AND TRADEMARK OFFICE
CERTIFICATE OF CORRECTION

PATENT NO. : 7,259,786 B2 Page 1 of 1
APPLICATION NO. : 10/677907
DATED : August 21, 2007
INVENTOR(S) : Masami Shimizu It is certified that error appears in the above-identified patent and that said Letters Patent is hereby corrected as shown below:

In the Specification at

Column 2, Line 8, "lossless-compress d" should be --lossless-compressed--.

Signed and Sealed this

Twenty-sixth Day of August, 2008

JON W. DUDAS
*Director of the United States Patent and Trademark Office*